US009379541B2

(12) United States Patent
Ellis-Monaghan et al.

(10) Patent No.: US 9,379,541 B2
(45) Date of Patent: Jun. 28, 2016

(54) EOS PROTECTION CIRCUIT WITH FET-BASED TRIGGER DIODES

(71) Applicant: International Business Machines Corporation, Armonk, NY (US)

(72) Inventors: John J. Ellis-Monaghan, Grand Isle, VT (US); Alain Loiseau, Williston, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 195 days.

(21) Appl. No.: 14/037,768

(22) Filed: Sep. 26, 2013

(65) Prior Publication Data

US 2015/0085408 A1   Mar. 26, 2015

(51) Int. Cl.
*H02H 9/04*   (2006.01)

(52) U.S. Cl.
CPC ..................... *H02H 9/046* (2013.01)

(58) Field of Classification Search
CPC . H02H 9/046; H01L 27/0251; H01L 27/0266
USPC ............................................................ 361/56
See application file for complete search history.

(56) References Cited

U.S. PATENT DOCUMENTS

| 5,159,518 | A | | 10/1992 | Roy |
| 5,166,089 | A | | 11/1992 | Chen et al. |
| 5,416,351 | A | | 5/1995 | Ito et al. |
| 5,530,271 | A | | 6/1996 | Fallica |
| 5,617,283 | A | * | 4/1997 | Krakauer et al. ............... 361/56 |
| 5,767,550 | A | | 6/1998 | Calafut et al. |
| 7,102,862 | B1 | * | 9/2006 | Lien ..................... H01L 27/0285 361/56 |
| 2005/0047042 | A1 | * | 3/2005 | Satou ................... H01L 27/0262 361/100 |
| 2005/0057866 | A1 | * | 3/2005 | Mergens ............. H01L 27/0262 361/56 |
| 2006/0209478 | A1 | * | 9/2006 | Arai ..................... H01L 27/0262 361/56 |
| 2007/0181948 | A1 | | 8/2007 | Liaw et al. |
| 2009/0141415 | A1 | * | 6/2009 | Moon ............................. 361/56 |
| 2009/0268359 | A1 | | 10/2009 | Chatty et al. |
| 2010/0078724 | A1 | | 4/2010 | Imoto et al. |
| 2012/0008243 | A1 | * | 1/2012 | Huitsing et al. ................. 361/56 |
| 2012/0037985 | A1 | * | 2/2012 | Smith ........................... 257/336 |
| 2014/0225186 | A1 | * | 8/2014 | Abou-Khalil et al. ........ 257/330 |

* cited by examiner

*Primary Examiner* — Stephen W Jackson
*Assistant Examiner* — Christopher Clark
(74) *Attorney, Agent, or Firm* — Michael Le Strange; Andrew M. Calderon; Roberts Mlotkowski Safran & Cole, P.C.

(57) ABSTRACT

An integrated circuit is disclosed, including a circuit with a first type of FET having a first breakdown voltage (VBD), resulting from a first set of design and manufacturing process parameters and having VBD tracking characteristics resulting from a second set of design and manufacturing process parameters. The IC may include a trigger device circuit a having a trigger FET that may generate, in response to the supply voltage exceeding a specified maximum, a signal on a trigger device output, causing a clamping device to couple the supply voltage node to the ground, to reduce the supply voltage. The trigger FET may be of a second type having a second VBD less than the first VBD, resulting from modifications to the first set of design and manufacturing process parameters, and VBD tracking characteristics resulting from the second set of design and manufacturing process parameters.

17 Claims, 7 Drawing Sheets

EOS PROTECTION CIRCUIT WITH FET-BASED TRIGGER DIODES

TECHNICAL FIELD

The present disclosure relates to electrical overstress (EOS) in integrated circuits (ICs). In particular, this disclosure relates to an EOS protection circuit having trigger characteristics similar to circuits it protects.

BACKGROUND

The trend of decreasing sizes of feature of ICs can make them increasingly vulnerable to voltages and currents outside of the IC's specified operating range. One type of voltage excursion outside of a specified operation range is electrical overstress (EOS). EOS events can cause permanent damage to small features of ICs such as interconnect metal and contacts.

In order to function properly and avoid damage, ICs need to be protected from voltages outside their specified ranges of operation. Since all external electrical events that may cause damage to an IC cannot necessarily be eliminated external to the IC, a protection circuit integral to the IC may be used to shield sensitive electrical regions and structures within the IC from damage due to EOS events. EOS protection circuits may ensure continued reliable functioning of the IC.

SUMMARY

Various aspects of the present disclosure may be particularly useful for providing a predictable and consistent operating voltage margin between a trigger voltage of a protection circuit and the breakdown voltage of a protected circuit. An IC designed according to embodiments of the present disclosure may be reliably and robustly protected from the effects of destructive EOS events.

Embodiments are directed towards an integrated circuit (IC). The IC may have a first circuit and a second circuit. The first circuit may be coupled to a supply voltage and to a ground and may include field-effect transistors (FETs) of a first type having a first breakdown voltage (VBD) resulting from a first set of design and manufacturing process parameters. The FETs of the first type may also have VBD process and temperature tracking characteristics resulting from a second set of design and manufacturing process parameters.

The second circuit may have a trigger device having a trigger FET that is configured to generate, in response to the supply voltage exceeding a specified maximum voltage, a signal on a trigger device output. The trigger FET may be coupled between a supply voltage and a trigger device output, and may be a second type of FET. The second type of FET may have a second VBD that is less than the first VBD, resulting from modifications to the first set of design and manufacturing process parameters. The second type of FET may also have VBD process and temperature tracking characteristics resulting from the second set of design and manufacturing process parameters.

The second circuit may also have a clamping device coupled to the supply voltage and to the ground, and configured to, in response to the signal on the trigger device output, reduce the supply voltage by connecting the supply voltage to the ground.

Other embodiments are directed towards a method for operating an electrical overstress (EOS) protection circuit. The method may include generating a trigger signal in response to a supply voltage exceeding a specified maximum supply voltage for a protected circuit, and exceeding a breakdown voltage of at least one trigger FET within a trigger device. The protected circuit may include field-effect transistors (FETs) of a first type having a first breakdown voltage (VBD), resulting from a first set of design and manufacturing process parameters. The FETs of the first type may have VBD process and temperature tracking characteristics resulting from a second set of design and manufacturing process parameters.

The trigger device may include at least one trigger FET of a second type, with a second VBD that is less than the first VBD, resulting from modifications to the first set of design and manufacturing process parameters. The FET of the second type may have VBD process and temperature tracking characteristics resulting from the second set of design and manufacturing process parameters.

The method may also include connecting a supply voltage node to a ground node by activating a clamping device in response to a first state of the trigger signal, and may also include disconnecting the supply voltage node from the ground node by deactivating the clamping device in response to a second state of the trigger signal.

Aspects of the various embodiments may be used to reduce unnecessary design margin between an operating voltage (VDD) of an IC and the trigger voltage of a trigger circuit used to protect the IC, and may increase the effective operating voltage range (VDD) of the IC. Aspects of the various embodiments may also be particularly useful for varying the VBD (trigger voltage) of the trigger circuit through modifications to the trigger circuit design. Aspects of the disclosure discussed herein may be used to modify the VBD of the FET of the first type, which may be useful in decreasing the FET's size, and increasing its drive current.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of embodiments of the disclosure and do not limit the invention.

In the drawings and the Detailed Description, like numbers generally refer to like components, parts, steps, and processes.

DETAILED DESCRIPTION

Figure 1:
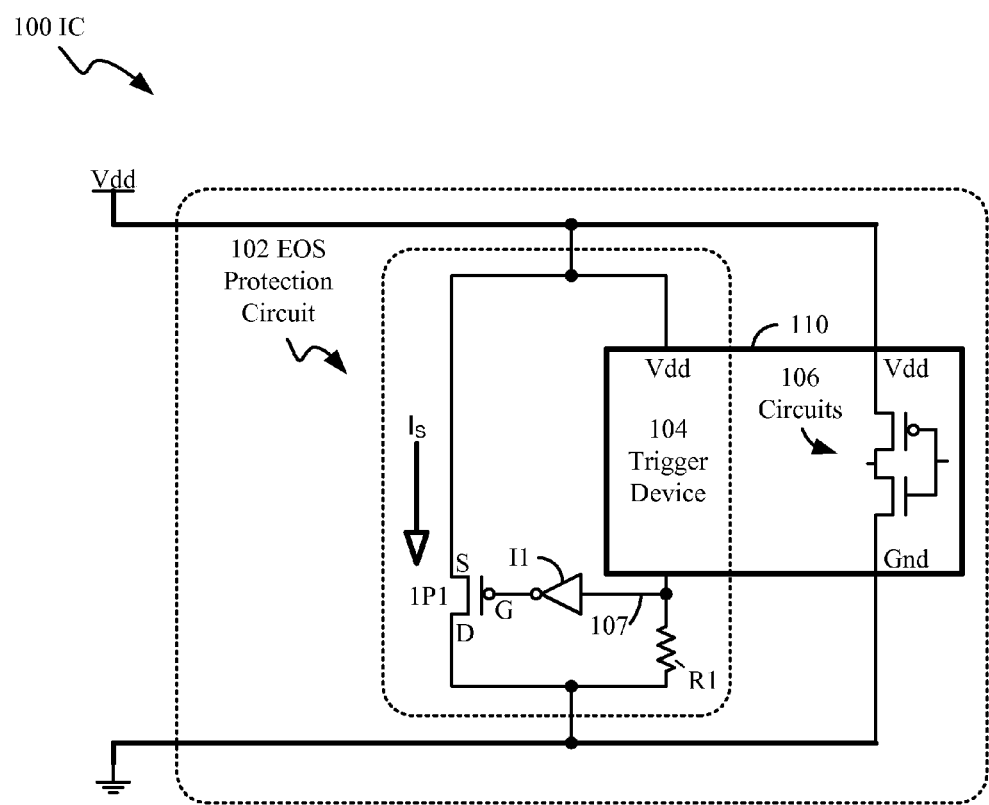
FIG. 1 is a schematic representation of an EOS protection circuit including a trigger device, a clamping device, and protected circuits, according to embodiments of the present disclosure.

Certain embodiments of the present disclosure can be appreciated in the context of an EOS protection circuit that includes a trigger device having a breakdown voltage (VBD) that tracks (over temperature and manufacturing process variations) with a VBD of high-voltage FET circuits being protected, generally on the same IC. Such EOS protection circuits may prevent damage to sensitive circuit structures of an IC during an EOS event. While not necessarily limited thereto, embodiments discussed in this context can facilitate an understanding of various aspects of the disclosure.

Certain embodiments may also be directed towards other equipment and associated applications, such as an EOS protection circuit created using the same manufacturing process as used for the FET circuits being protected, but created on an IC die separate from the protected circuits. Embodiments may also be directed towards an EOS protection circuit designed for protecting low-voltage FETs, such as may be used for logic circuits, from EOS events.

While all figures illustrate the principles and features of the present disclosure, additional embodiments may include modifications to and variations of circuitry depicted, within the scope and spirit of the disclosure.

Various embodiments of the present disclosure relate to the protection of IC FET circuits from EOS events through the use of a protection circuit with triggering characteristics that track with the VBD of the protected FET circuits over a range of temperatures and manufacturing variations. The disclosed protection circuit can thereby maintain a consistent and predictable margin between its trigger voltage and the IC's VBD, and may allow an IC to be reliably operated at a supply voltage (VDD) close to its VBD. While the disclosure is not necessarily limited to such embodiments, various aspects of the invention may be appreciated through a discussion of various examples using this context.

Certain embodiments relate to protection of IC's from destructive consequences of electrical overstress (EOS) events. During the operation of an IC including FET devices, the IC may be subjected to electrical overstress (EOS) events. EOS is a term that generally refers to thermally related damage resulting from high current flow, which may occur in an IC (or other electronic device) when it is subjected to a voltage beyond its specification limits. EOS events may originate from many sources, both internal and external to the IC. An EOS event may cause significant and irreversible damage to sensitive areas of an IC, possibly rendering it non-functional. Protection circuits may be designed into the IC to reduce or eliminate the effects of EOS events.

An EOS event may be momentary, for example lasting milliseconds, or may last for an extended, indefinite period of time. Damage from electrical overstress may result from a single, non-recurring event, such as a power supply spike, caused by a power line voltage surge, or may result from ongoing periodic or non-periodic events, such as a defective power supply producing an output voltage that is frequently over a specified maximum. EOS events generally involve voltages less than 100V, peak currents greater than 10 A, and at least one event lasting longer than 1 ms. EOS events may be distinguished from ESD events in that they generally involve a lower voltage, longer duration, and higher current than ESD events.

EOS events may originate from many sources, both internal and external to the IC, and generally involve the power supply network of an IC being subjected to a voltage greater than a specified maximum voltage for the IC. EOS event sources within the IC may include internal power distribution structures that are inadequate to carry a required current, and/or voltage overshoot/undershoot occurring during I/O driver switching.

EOS sources external to the IC may include but are not limited to: power supply output voltage fluctuation (possibly resulting from power line transients), power supply variation/failure, or improper power distribution system or power supply design. Other EOS sources external to the IC may include voltage spikes from switching internal to a PC board, external interface connections such as a cable or inductive load, or external electromagnetic interference (EMI). Electrostatic discharge (ESD) events and resulting damage may also weaken an IC, making it more susceptible to future EOS events.

Damage to an IC resulting from EOS events generally results from heating of connections within the IC. High currents experienced during the EOS event may generate localized high temperatures in conductive paths. The high temperatures may cause destruction of materials within the IC, including but not limited to burning or melting of metal conductors, cracking IC die, shorting or opening of conductor paths, and melting of IC bond wires. An EOS event may cause significant and irreversible damage to sensitive areas of an IC, possibly rendering it non-functional.

An IC that has experienced damage due to EOS events may draw excess supply current, have extraordinarily low resistance between the supply voltage terminal and ground, have open or shorted connections involving one or more pins, or may not function due to internal device damage. The IC may also display visual indications of damage such as discoloration of, or a bulge, crack or hole in the package mold compound surrounding the die.

The unpredictable nature of EOS events may cause internal IC damage, resulting in random and unpredictable IC failures. High-voltage (HV) FET circuits may be especially susceptible to EOS damage, due to the relatively small voltage margin between their operating supply voltage (VDD) and an HV FET breakdown voltage (VBD). Protection circuits may be designed into an IC to reduce or eliminate the effects of EOS events, and may be particularly useful in protecting HV FET circuits, and ensuring reliable and stable circuit operation.

In contrast to FET devices designed for logic and microprocessor circuits, which generally operate at a low voltage, a high-voltage (HV) FET may be designed for switching and modulating substantially higher voltages without suffering internal damage. A low-voltage FET, for example, may operate at a nominal voltage of 1V, and may sustain damage if operated at a voltage above 2V. A high-voltage FET, however, may operate at a nominal voltage of 50V, and may not sustain damage until subjected to a voltage of 70V. An IC containing HV FETs may be useful for switching and modulating voltages related to power supplies, motors or inductive loads, or other electronic devices making use of higher voltages.

An effective EOS protection circuit may be designed to sense an increasing supply voltage (VDD) level above a specified threshold, and respond by limiting the voltage increase before it can damage the IC. In order for this circuit to be effective, it may have a trigger threshold consistently and sufficiently less than the VBD of protected devices, in conjunction with a limiting (clamping) circuit that can adequately respond before the supply voltage reaches the protected device VBD.

In addition, the clamping device may be robust enough to carry sufficient current to effectively lower the rising VDD. The protection circuit may need to be located on the protected IC, and not subject to excess parasitic factors such as electronic package inductance or capacitance, or signal delay.

A protection circuit may include a trigger device, a clamping device and a buffer that connects the output of the trigger device to the clamping device. The trigger device may be designed to generate a signal, for example, when an IC voltage supply node reaches or exceeds a specified maximum voltage. The signal from the trigger device may be transferred by the buffer or inverter to the clamping device. When the clamping device receives the signal from the buffer or inverter, it may couple the supply node to the ground, which may shunt current to ground, reducing the voltage on the supply node to a level that does not result in damage to the IC or its package.

A breakdown voltage (VBD) of a semiconductor device such as a diode or FET is generally the voltage at which the device experiences a rapid increase in current across two terminals of the device in response to an increase in the voltage across those terminals. In the case of a diode, for example, the two terminals are the anode and cathode. In the case of a FET, the two terminals may be the source and drain, and the current increase may occur regardless of the voltage between the FET gate and source (VGS). ICs may contain FET devices, having a breakdown voltage (VBD), at which a rapid increase in current flow may occur in response to a drain-source voltage, possibly causing damage to the FETs.

An EOS protection circuit may need to be designed to operate under the constraints of two interrelated voltage margins; a voltage margin between its trigger voltage and the supply voltage (VDD) of the protected circuits, and another voltage margin between its trigger voltage and the breakdown voltage (VBD) of the protected circuits.

The trigger voltage of the protection circuit may be greater than the protected circuit VDD, and less than the protected circuit VBD. If the margin between the trigger voltage and the protected circuit VDD is too small, minor, nondestructive fluctuations in VDD may cause unnecessary triggering of the protection circuit. If the margin between the trigger voltage and the protected circuit VBD is too small, the protected circuit may suffer damage as a result of the protection not being activated at the appropriate time to limit the supply voltage. Both margins may need to be maintained over a range of operating conditions and manufacturing process parameters to ensure robust EOS protection circuit operation.

Trigger voltage margins discussed may both be determined through design and circuit simulation for a particular set of manufacturing process parameters, operating voltage and operating temperature, for example at nominal process, voltage and temperature conditions.

If the trigger voltage for the protection circuit is based on the VBD of a particular type of circuit that has different design and/or process characteristics than the protected circuit, then the VBD of the trigger circuit may not track closely with the VBD of the protected circuit over a range of process voltage and temperature conditions. This may result in trigger voltage margins that are either too large or too small for an application, which may result in loss of device performance, lack of robust protection, or activation of the protection circuit when protection is not needed.

As an example, a diode fabricated as part of an IC may be used as a trigger device to generate a trigger signal at a VBD lower than the VBD of a protected FET circuit. A designer may specify the diode VBD to create adequate margin between the diode VBD of protected FET VBD under nominal conditions. However, the diode VBD may not track closely with the FET VBD under certain conditions, for instance at high voltage, low temperature, and worst-case process conditions. This may create a margin between the two VBDs under these conditions that is larger than the margin under nominal conditions. In this example, false triggering of the protection circuit may result from minor, non-destructive VDD fluctuations, which may cause the IC to malfunction.

In order to avoid the described scenario, a designer may have to account for the size of the VBD margins over a wide variety of process, voltage, and temperature conditions. This may result in the designer having to reduce the operating VDD of the protected circuit, in order to accommodate the two enlarged margins. This may result in a loss of performance (reduction of VDD) of the protected circuit, due to the inconsistent and possibly unpredictable VBD to VBD, and VBD to VDD margins.

The lack of close tracking of the VBD of the diode, in this example, and a protected FET device may be due to different semiconductor structures, layers and materials used in the construction of each device. Even though a diode and a FET device may be fabricated on the same IC, differing design structures, materials, and doping concentrations may cause the VBD of each device to deviate from nominal values in unique and different ways over a range of operating conditions and manufacturing process parameters.

Various embodiments of the present disclosure relate to designing and manufacturing an EOS protection circuit that allows protected FET circuits on an IC to consistently operate at a VDD level near their breakdown voltage (VBD). The disclosed EOS protection circuit may therefore allow high performance of FET circuits on an IC while providing reliable and robust EOS protection.

An EOS protection circuit according to embodiments relating to trigger circuits discussed herein may have a trigger voltage level (VBD of a trigger FET) that may be modified by changing trigger FET design and/or IC manufacturing parameters.

Certain figures show FET devices as protected circuits, however, embodiments may include a plurality of active element types, including FETs, bipolar transistors or other types. Certain figures show a small number of protected devices; however embodiments may include a plurality of protected devices. While all figures illustrate the principles and features of the present disclosure, additional embodiments may include other types of clamping, trigger, and coupling devices, and other possible modifications to and variations of circuitry depicted, within the scope and spirit of the disclosure.

FIG. 1 is a schematic depicting an EOS protection circuit 102, fabricated within an integrated circuit (IC) 100, and generally used for protecting circuits 106 of the IC 100 from electrical overstress (EOS) events, according to embodiments of the present disclosure. The trigger device 104 of EOS protection circuit 102 may include devices designed and manufactured to have breakdown voltage tracking characteristics similar to those of devices included in FET circuits 106. Region 110 represents circuits in an IC that share a similar manufacturing process and process parameters, but may not necessarily be located physically close to each other on the IC. Similar breakdown voltage tracking characteristics may allow for a consistent and predictable margin between protected circuit 106 breakdown voltages and trigger device 104 breakdown (trigger) voltages across a range of operating conditions (e.g., temperature). This margin may enable high operating voltages (VDD) for circuit 106, and high performance of circuits 106 while ensuring robust EOS protection over a range of manufacturing process and operating conditions.

EOS protection circuit 102 may protect circuits 106 by creating a current shunt path between VDD and ground in response to a VDD voltage greater than a specified breakdown voltage of the trigger device 104. Both EOS protection circuit 102 and circuits 106 may contain FET devices. EOS protection circuit 102 may include a trigger circuit 104 designed to create a trigger signal in response to a VDD voltage less than the breakdown voltage of circuits 106. The trigger circuit 104 may include at least one FET device having a breakdown voltage that is designed to be less than the circuits 106 breakdown voltage.

When VDD exceeds the trigger circuit 104 breakdown voltage, the trigger circuit 104 may respond by allowing current to flow from VDD through a resistor R1, creating a voltage drop at node 107. The voltage at node 107 may rise and exceed an input threshold voltage of inverter I1 causing its output to switch to a low logic state, turning on a clamping device (PFET) 1P1 through its gate input (G). When PFET 1P1 is turned on, it may create a low-impedance current shunt path between its source (S) and the drain (D) terminals, thereby coupling VDD to ground. When PFET 1P1 is turned on current $I_S$ may flow, thereby limiting the voltage on VDD. EOS protection circuit 102 is particularly useful in protecting circuits 106 by limiting VDD to a voltage less than the breakdown voltage circuits 106, above which damage may be caused to circuits 106.

A designer may specify a value of resistor R1 that may produce a voltage drop in response to the current through the trigger device that causes inverter input voltage to cross an input threshold, causing inverter I1 to produce a low output, turning on the clamping FET 1P1. A designer may also specify width and length dimensions for FET 1P1 that allow the FET to sink current $I_S$. Other types of devices with similar functions to inverter I1 and clamping FET 1P1 may be specified, for example a bipolar transistor may be used as a clamping device, and a buffer may be used to couple trigger device 104 to the clamping device. The above-listed design specifications may be made in order to ensure that the EOS protection circuit 102 responds to a particular type of anticipated EOS event in a timely fashion and with sufficient capability to limit voltage fluctuation before it causes damage to circuits 106.

Circuits 106 may be high voltage (HV) FETs, or other types of devices such as logic circuits. The present disclosure generally relates to FET devices included in both trigger and protected circuits; however embodiments may also include different types of semiconductor devices such as bipolar transistors.

The embodiment depicted in FIG. 1 includes the trigger circuit 104 of EOS protection circuit 102 and circuits 106 manufactured on the same IC 100, and sharing a second set of design and manufacturing parameters. The shared second set of design and manufacturing parameters may generally result in the trigger circuit 104 and circuits 106 experiencing closely related VBD tracking characteristics over a range of manufacturing process parameters, operating voltages and operating temperatures, and may result in robust EOS protection, and high-performance HV FET circuits.

A first set of design and manufacturing parameters is used in creating circuits 106, and may result in a first VBD for circuits 106. The first set of design and manufacturing parameters may be modified, and used in creating trigger circuit 104, which may result in a lower VBD for trigger circuit 104.

Figure 2:
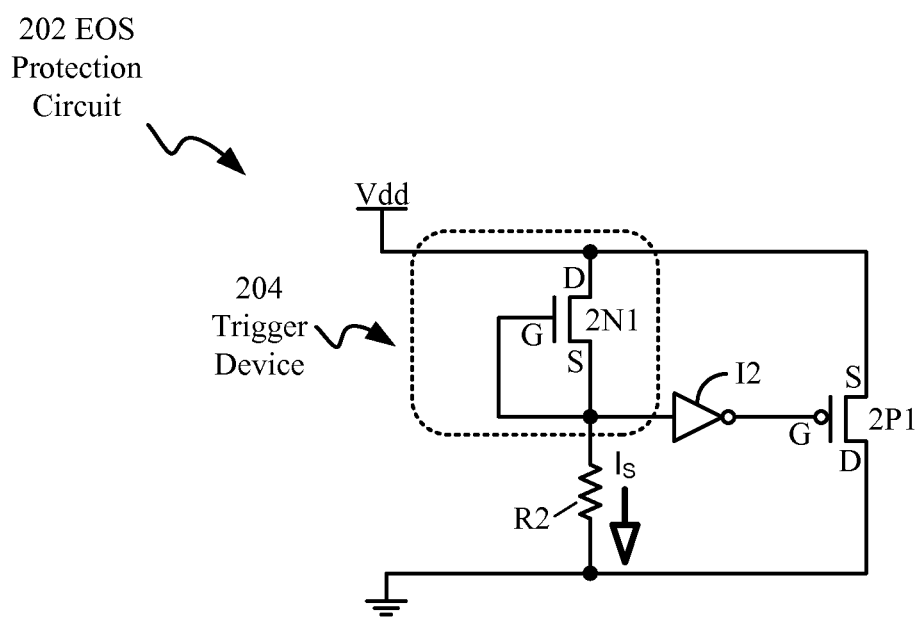
FIG. 2 is a schematic representation of an EOS protection circuit with a trigger device that includes an n-channel FET (NFET), according to embodiments.

FIG. 2 is a schematic representation of an EOS protection circuit 202, consistent with EOS protection circuit 102 (FIG. 1), having a trigger device 204 that includes an NFET 2N1, according to embodiments. EOS protection circuit 202 may be fabricated within an IC, and generally used for protecting circuits of the IC from electrical overstress (EOS) events, according to embodiments.

NFET 2N1 may be designed and manufactured to have breakdown voltage tracking characteristics similar to those of devices included in protected FET circuits such as 106 (FIG. 1). Similar breakdown voltage tracking characteristics may allow for a consistent and predictable margin between protected circuits breakdown voltages and trigger device 204 breakdown (trigger) voltages.

NFET 2N1 may have a breakdown voltage that is designed to be less than protected circuits such as 106 (FIG. 1) breakdown voltage. NFET 2N1 has its gate (G) and source (S) coupled to resistor R2, and its drain (D) coupled to a supply voltage VDD, and may exhibit breakdown characteristics similar to that of a PN junction diode, as it is connected in FIG. 2.

Resistor R2, clamping device (PFET) 2P1, and inverter I2 can be consistent with resistor R1, clamping device (PFET) 1P1, and inverter I1 (FIG. 1) in structure, interconnect and function. EOS protection circuit 202 can be consistent with EOS protection circuit 102.

EOS protection circuit 202 may protect circuits such as 106 (FIG. 1) by creating a current shunt path between VDD and ground in response to a VDD voltage greater than a specified breakdown voltage of the trigger device 204. EOS protection circuit 202 may include a trigger device 204 designed to create a trigger signal in response to a VDD voltage less than the breakdown voltage of protected circuits.

The embodiment depicted in FIG. 2 includes the trigger circuit 204 of EOS protection circuit 202 which may be manufactured on the same IC as circuits it protects, and may share a second set of design and manufacturing parameters with the protected circuits. A shared second set of design and manufacturing parameters may generally result in the trigger circuit 204 and protected circuits experiencing closely related VBD tracking characteristics over a range of manufacturing process parameters, operating voltages and operating temperatures.

A first set of design and manufacturing parameters may be used in creating circuits protected by EOS protection circuit 202 and may result in a first VBD for the protected circuits. The first set of design and manufacturing parameters may be modified, and used in creating trigger circuit 204, which may result in a lower VBD for trigger circuit 204.

Figure 3:
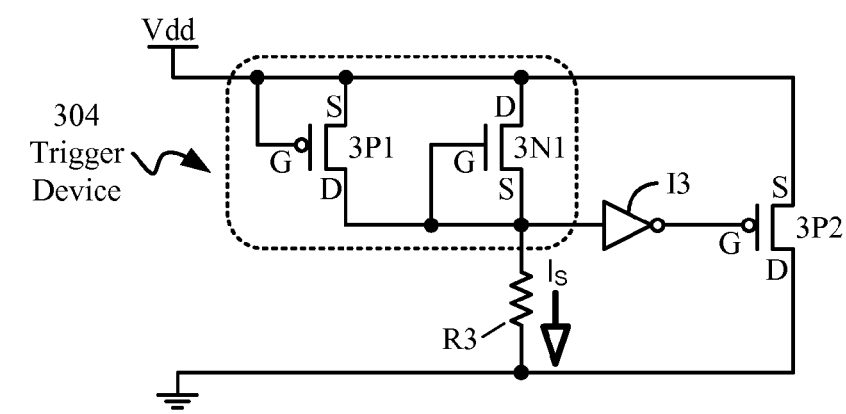
FIG. 3 is a schematic representation of an EOS protection circuit with a trigger device that includes an NFET and a p-channel FET (PFET), according to embodiments.

FIG. 3 is a schematic representation of an EOS protection circuit 302, consistent with EOS protection circuits 102, 202, having a trigger device 304 that includes an NFET 3N1, and a PFET 3P1 according to embodiments. EOS protection circuit 302 may be fabricated within an IC, and generally used for protecting circuits of the IC from electrical overstress (EOS) events, according to embodiments.

NFET 3N1 and PFET 3P1 may be designed and manufactured to have breakdown voltage tracking characteristics similar to those of devices included in protected FET circuits such as 106 (FIG. 1). Similar breakdown voltage tracking characteristics may allow for a consistent and predictable margin between protected circuits breakdown voltages and trigger device 304 breakdown (trigger) voltages.

NFET 3N1 and PFET 3P1 may have breakdown voltages that are designed to be less than breakdown voltages of protected circuits such as 106 (FIG. 1). NFET 3N1 has its gate (G) and source (S) coupled to resistor R3, and its drain (D) coupled to a supply voltage VDD. PFET 3P1 has its gate (G) and source (S) coupled to a supply voltage VDD, and its drain (D) coupled to resistor R3.

Using both an NFET and a PFET in a parallel configuration, as depicted in FIG. 3 may ensure a more robust trigger device. The parallel configuration may offer more protection in the case of manufacturing process drift that affects one FET device type (NFET or PFET), allowing the FET with the lower VBD to trigger the protection circuit first.

Embodiments may also include multiple NFET trigger devices in parallel, multiple PFET trigger devices in parallel, or various combinations of NFET and PFET trigger devices. The combination of various FET trigger devices may exhibit breakdown characteristics similar to that of a PN junction diode, as they are connected in FIG. 3.

Resistor R3, clamping device (PFET) 3P2, and inverter I3 may be consistent with resistor R1, clamping device (PFET) 1P1, and inverter I1 (FIG. 1) in structure, interconnect and function. EOS protection circuit 302 can be consistent with EOS protection circuit 102.

EOS protection circuit 302 may protect circuits such as 106 (FIG. 1) by creating a current shunt path between VDD and ground in response to a VDD voltage greater than a specified breakdown voltage of the trigger device 304. EOS protection circuit 302 may include a trigger device 304 designed to create a trigger signal in response to a VDD voltage less than the breakdown voltage of protected circuits.

The embodiment depicted in FIG. 3 includes the trigger circuit 304 of EOS protection circuit 302 which may be manufactured on the same IC as the circuits it protects, which may generally result in the trigger circuit 304 and protected circuits experiencing closely related VBD tracking characteristics over a range of manufacturing process parameters, operating voltages and operating temperatures.

Figure 4:
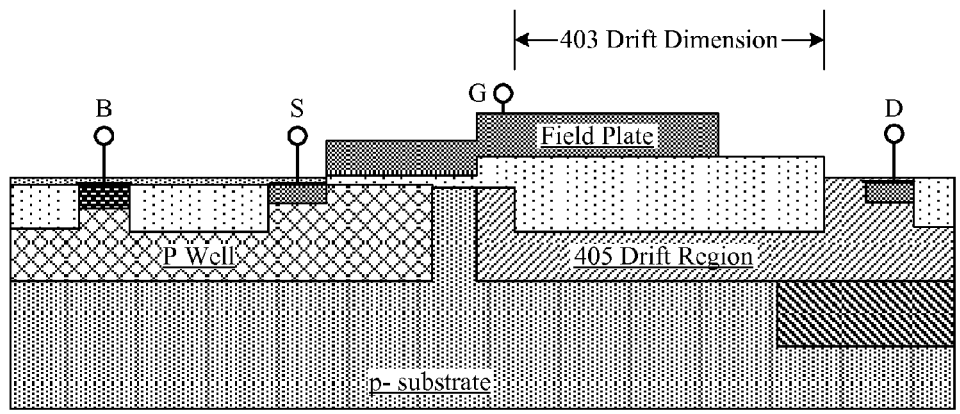
FIG. 4 is a cross-sectional drawing of a trigger device FET, according to embodiments.

FIG. 4 is a cross-sectional drawing of a high voltage (HV) trigger device FET, illustrating the drift region and drift dimension according to embodiments. FIG. 4 depicts various regions of the FET and the body (B), source (S), gate (G), and drain (D) terminals. The size of drift region 405 and drift dimension 403 are two FET design parameters that a designer may modify in order to adjust the VBD of a trigger FET. It has been recognized that modifying these parameters is relatively straightforward using available IC layout software.

Increasing either the drift region width or the drift dimension of a FET generally increases its breakdown voltage (VBD). The drain junction doping concentration may also be modified to influence the VBD of a trigger FET. In general, decreasing drain junction doping increases a FETs breakdown voltage (VBD). Increasing the M1 field plate length of a trigger FET may also increase the VBD of the FET. Performing any of these modifications to a trigger FET design may allow a designer to adjust its VBD to a value having a particular margin with the VBD of protected FET devices.

The second set of design and manufacturing parameters shared by both the trigger device FET(s) and the protected device FET(s) may provide a consistent margin between their respective VBDs over a range of temperature, voltage, and manufacturing process parameter variations. This margin may be made to be suitable to a particular application as well as provide a trigger circuit VBD that may track closely to the VBD of protected FETs over a range of temperature, voltage, and manufacturing process parameter variations.

The VBD of the trigger circuit may generally be specified to be less than the VBD of the protected circuit, to provide sufficient time, and sufficient voltage margin between a trigger voltage of the trigger circuit and the breakdown voltage (VBD) of the protected circuit to allow the protection circuit to respond and prevent damaging voltage from reaching the protected circuit.

The trigger FET 400 depicted in FIG. 4 is generally consistent with trigger FETs 2N1 and 3N1 (FIG. 2, 3 respectively).

Figure 5:
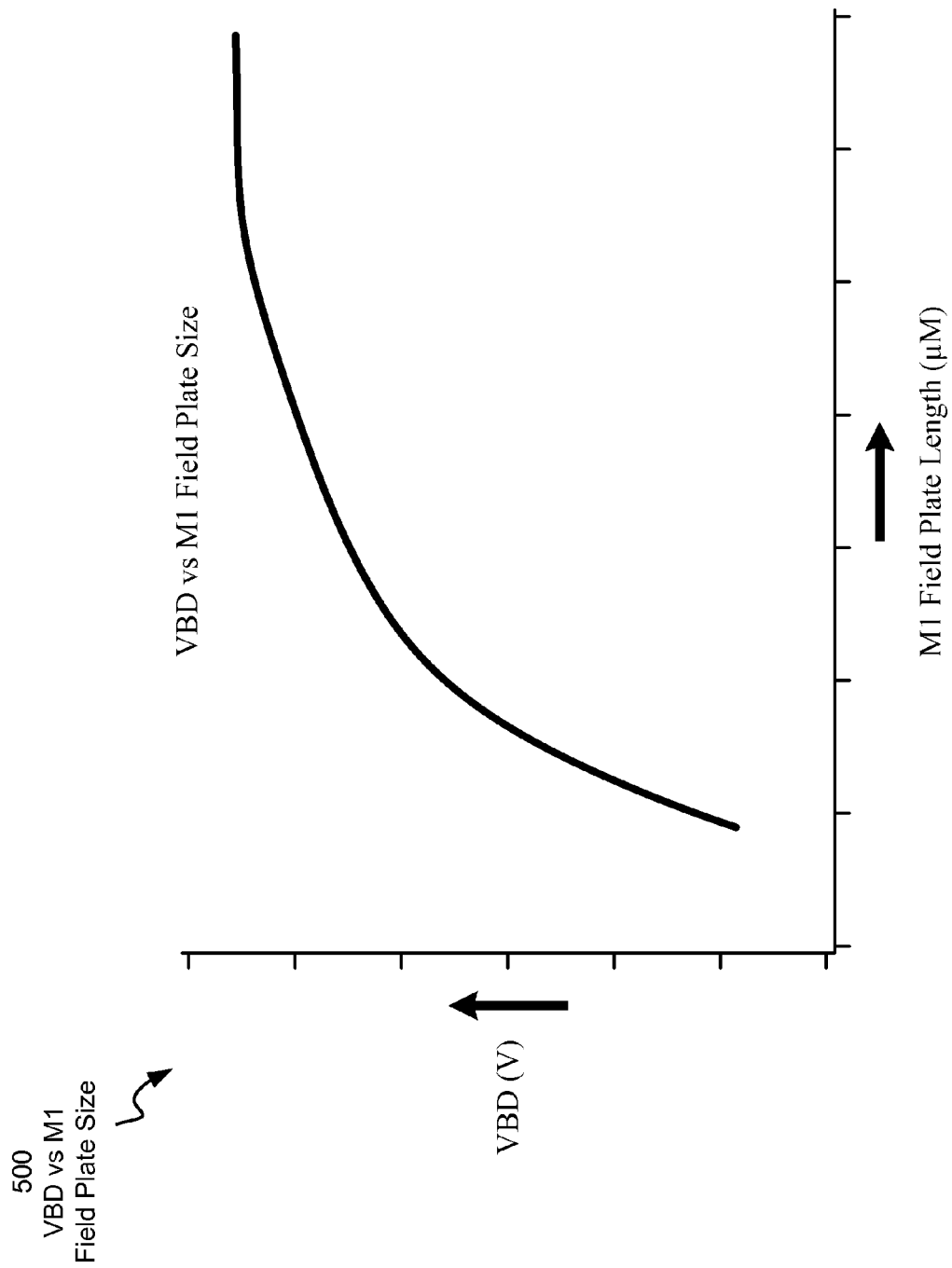
FIG. 5 is a graph of VBD plotted against first level metal (M1) field plate length, according to embodiments.

FIG. 5 is a graph of a breakdown voltage VBD (V) plotted against M1 Field Plate Size (μM) for a trigger FET, according to embodiments. VBD vs. M1 field plate size 500 illustrates how decreasing field plate size may be effective in decreasing VBD, a relationship which may be useful in altering FET geometries illustrated in FIG. 4. The VBD vs. M1 field plate size 500 depicted in FIG. 5 are generally applicable to trigger FETs 2N1 and 3N1 (FIG. 2, 3 respectively).

Figure 6:
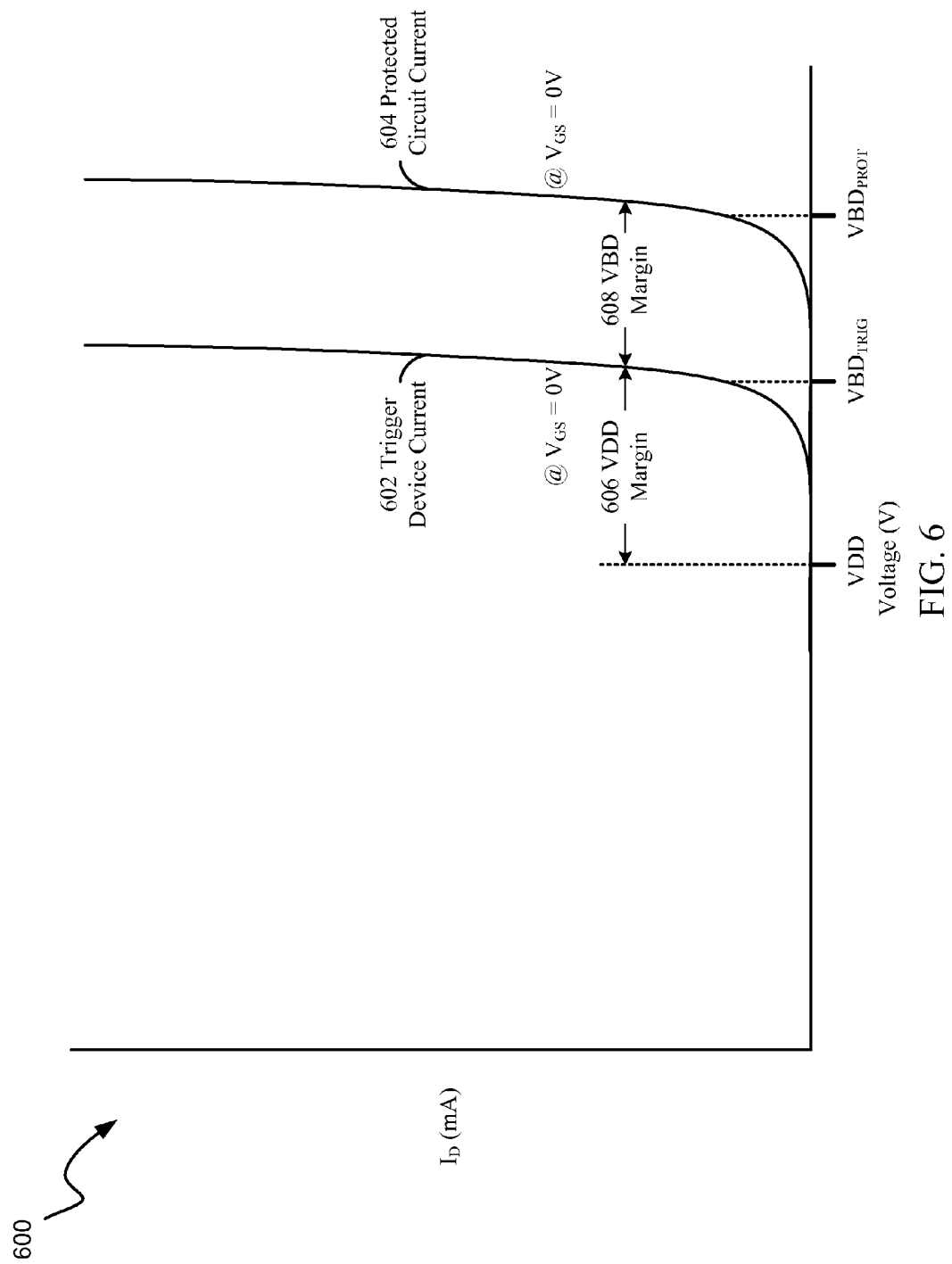
FIG. 6 is a graph of drain current ($I_D$) plotted against VDD and VBD voltages, according to embodiments.

FIG. 6 is a graph of drain current ($I_D$) plotted against drain-source ($V_{DS}$) voltages for a trigger FET and a protected FET, according to embodiments. Depicted on the X axis are VDD (a nominal operating voltage for HV FET circuits), and breakdown voltages $VBD_{TRIG}$ and $VBD_{PROT}$, for a trigger circuit and protected circuits, respectively. $VBD_{TRIG}$ illustrates the breakdown voltage of a trigger circuit, and the trigger device current 602 curve illustrates the current vs. voltage relationship for a trigger device. The rapid rise of $I_D$ in response to increasing voltage illustrated by this curve is a characteristic that is useful for creating a trigger signal that is used to activate a clamping device, as discussed in reference to FIG. 1, 2, 3.

$VBD_{PROT}$ illustrates the breakdown voltage of a protected circuit, and the protected circuit current 604 curve illustrates the current vs. voltage relationship for a protected device. The rapid rise of $I_D$ in response to increasing voltage illustrated by this curve illustrates the rapid rise in current that may flow through vulnerable FET devices, and may causing rapid local heating and possible device damage, as discussed in reference to FIG. 1. VDD margin 606 illustrates the voltage margin between VBD1 and VDD, and VBD margin 608 illustrates the voltage margin between $VBD_{TRIG}$ and $VBD_{PROT}$, as discussed in reference to FIG. 1. The graph also illustrates the trigger circuit VBD ($VBD_{TRIG}$) being greater than the operating VDD, and the protected circuit VBD ($VBD_{PROT}$) greater than the trigger device VBD. If the trigger device has similar design and manufacturing characteristics (other than VBD parameters) as the protected device, the margins 606 and 608 may remain relatively constant over a range of operating temperatures, voltages, and manufacturing process variations.

Figure 7:
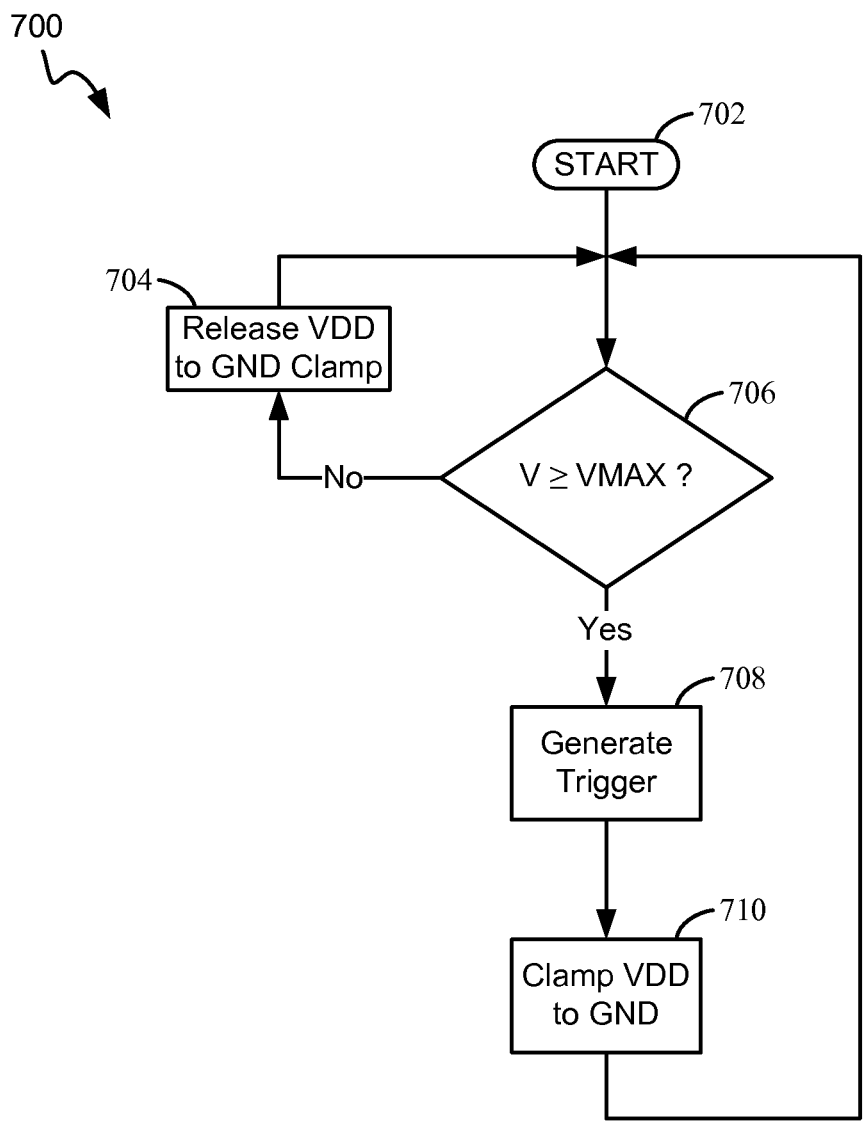
FIG. 7 is a flow diagram illustrating a method for using an EOS protection circuit of an IC, according to embodiments.

FIG. 7 is a flow diagram illustrating a method for using an EOS protection circuit of an integrated circuit (IC), according to embodiments. FIG. 7 depicts a closed loop monitoring and feedback device, which may provide an IC with continuous, direct response and protection from EOS events.

The process 700 moves from start 702 to decision 706. At decision 706, the protected circuit supply voltage is evaluated against a specified maximum supply voltage (trigger device VBD) by the trigger device of the EOS protection circuit. If the protected circuit supply voltage exceeds the trigger device VBD then the process moves to operation 708. If the protected circuit supply voltage is less than the VBD of the trigger device, then the process moves to operation 704. The trigger device may include various combinations of NFETs and PFETs and as described herein, and a designer may also modify FET parameters to create a trigger device with a specified VBD for a specific application. As long as the supply voltage exceeds the VBD of at least one FET within a trigger device, a trigger signal may be generated.

At operation 704, the clamping device is released in response to the absence (second state) of the trigger signal, thereby disconnecting the coupling of supply voltage VDD to ground by deactivating the clamping device. The process then returns to decision 706, where the protected circuit supply voltage is re-evaluated by the trigger device of the EOS protection circuit.

At operation 708, a first (active) state of the trigger signal is generated in response to the protected circuit supply voltage exceeding the VBD of the trigger device. The trigger signal may result from current flow due to a FET within the trigger device being held at a VBD of the FET. The trigger signal is coupled by an inverter or buffer to the clamping device, and the process moves to operation 710.

At operation 710, the clamping device is activated in response to an activated (first) state of the trigger signal. Activating the clamping device may cause the supply voltage VDD to be reduced to a level below VBD of the protected devices, which may prevent damage to the IC. Following operation 710, the process then returns to decision 706, where the protected circuit supply voltage is re-evaluated by the trigger device of the EOS protection circuit.

Although the present invention has been described in terms of specific embodiments, it is anticipated that alterations and modifications thereof may become apparent to those skilled in the art. Therefore, it is intended that the following claims be interpreted as covering all such alterations and modifications as fall within the true spirit and scope of the invention.

What is claimed is:

1. An integrated circuit (IC) comprising:
   a first circuit coupled to a supply voltage and to a ground and including field-effect transistors (FETs) of a first type having a first breakdown voltage (VBD) resulting from a first set of design and manufacturing process parameters and having VBD process and temperature tracking characteristics resulting from a second set of design and manufacturing process parameters; and
   a second circuit having:
   a trigger device having a trigger FET that is configured to generate, in response to the supply voltage exceeding a specified maximum voltage, a signal on a trigger device output, the trigger FET coupled between a supply voltage and a trigger device output and being of a second type having:
      a second VBD that is less than the first VBD resulting from modifications to the first set of design and manufacturing process parameters, and
      VBD process and temperature tracking characteristics resulting from the second set of design and manufacturing process parameters; and
   a clamping device coupled to the supply voltage and to the ground and configured to, in response to the signal on the trigger device output, reduce the supply voltage by connecting the supply voltage to the ground,
   wherein:
   the trigger FET comprises an NFET having a source and a gate directly coupled to the trigger device output, and a drain directly coupled to the supply voltage, and
   the trigger FET further comprises a PFET having a source and a gate directly coupled to the supply voltage, and a drain directly coupled to the trigger device output.

2. The IC of claim 1, wherein the trigger device comprises a set of more than one NFETs, each of the set having a source and a gate directly coupled to the trigger device output, and a drain directly coupled to the supply voltage.

3. The IC of claim 1, wherein the modifications to the first set of design and manufacturing process parameters include modifications to a FET drift region dimension for the at least one trigger FET of the second type.

4. The IC of claim 1, wherein the modifications to the first set of design and manufacturing process parameters include modifications to a FET field plate dimension for the at least one trigger FET of the second type.

5. The IC of claim 1, wherein the modifications to the first set of design and manufacturing process parameters include modifications to a FET drain junction doping level for the at least one trigger FET of the second type.

6. The IC of claim 1, wherein the trigger device output is coupled to the clamping device input through at least one member of a group consisting of: an inverter and a buffer.

7. The IC of claim 1, wherein the trigger device output is coupled to the ground through a resistor.

8. The IC of claim 1, wherein the clamping device is a FET.

9. A method for operating an electrical overstress (EOS) protection circuit, comprising:
   generating a trigger signal in response to a supply voltage exceeding a specified maximum supply voltage for a protected circuit and exceeding a breakdown voltage of at least one trigger field-effect transistor (FET) within a trigger device;
   the protected circuit including FETs of a first type having a first breakdown voltage (VBD) resulting from a first set of design and manufacturing process parameters and having VBD process and temperature tracking characteristics resulting from a second set of design and manufacturing process parameters;
   the trigger device including at least one trigger FET of a second type having a second VBD that is less than the first VBD resulting from modifications to the first set of design and manufacturing process parameters, and having VBD process and temperature tracking characteristics resulting from the second set of design and manufacturing process parameters;
   connecting a supply voltage node to a ground node by activating a clamping device in response to a first state of the trigger signal; and
   disconnecting the supply voltage node from the ground node by deactivating the clamping device in response to a second state of the trigger signal,
   wherein:
   the at least one trigger FET comprises an NFET having a source and a gate directly coupled to a trigger device output, and a drain directly coupled to the supply voltage node, and
   the at least one trigger FET further comprises a PFET having a source and a gate directly coupled to the supply voltage, and a drain directly coupled to the trigger device output.

10. The method of claim 9, wherein the modifications to the first set of design and manufacturing process parameters include modifications to a FET drift region dimension for at least one trigger FET of the second type.

11. The method of claim 9, wherein the modifications to the first set of design and manufacturing process parameters include modifications to a FET field plate dimension for at least one trigger 1-ET of the second type.

12. The method of claim 9, wherein the modifications to the first set of design and manufacturing process parameters include modifications to a FET drain junction doping level for at least one trigger FET of the second type.

13. The method of claim 9, further comprising providing the trigger device to the clamping device using at least one member of a group consisting of: an inverter and a buffer.

14. The method of claim 9, further comprising coupling the trigger device to a ground through a resistor.

15. The method of claim 9, connecting a supply voltage node to a ground node by activating a wherein
   the clamping device is a FET.

16. The IC of claim 7, wherein a value of the resistor is set such that the clamping device is turned on.

17. The IC of claim 1, wherein the field-effect transistors (FETs) of the first circuit are high-voltage (HV) field-effect transistors (FETs) which operate at high voltages without suffering internal damage.

* * * * *